June 3, 1941. G. R. MEYERCORD 2,244,343
JOINT AND STRUCTURE EMBODYING THE SAME
Filed Nov. 7, 1938 2 Sheets-Sheet 1
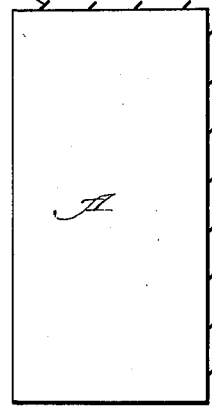
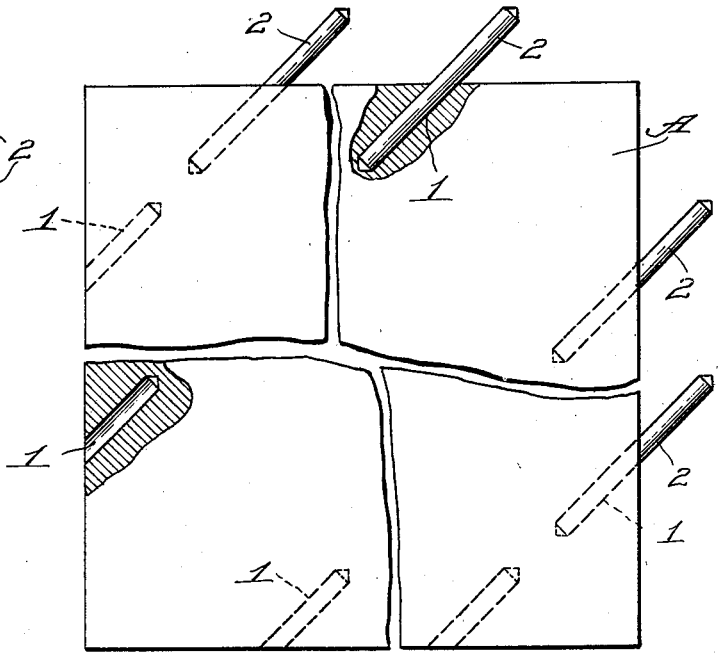
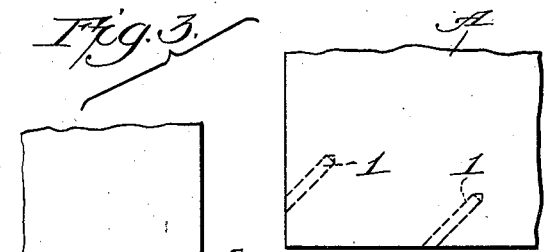
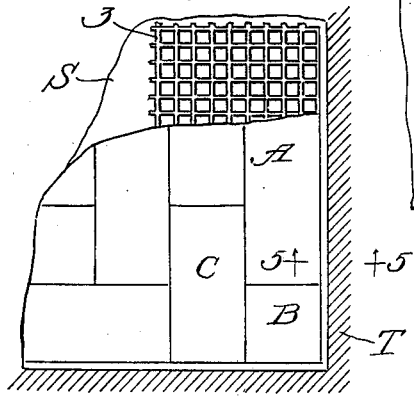
Inventor:
G. R. Meyercord.
by Wm. F. Freudenreich
Atty

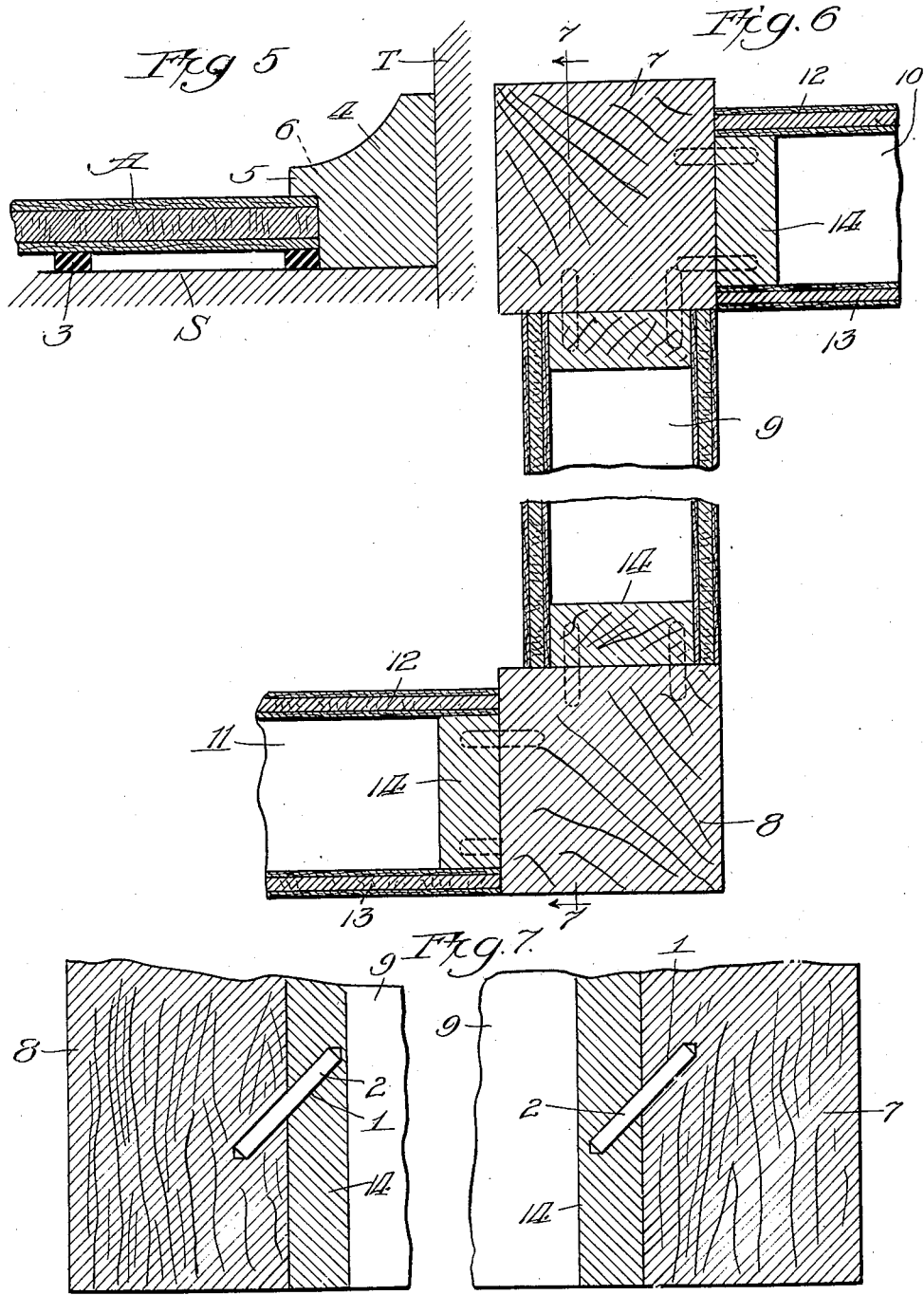

Patented June 3, 1941

2,244,343

UNITED STATES PATENT OFFICE 2,244,343

JOINT AND STRUCTURE EMBODYING THE SAME

George R. Meyercord, Chicago, Ill.; Agnes Adams Meyercord, George R. Meyercord, Jr., and Edward B. Meyercord executors of said George R. Meyercord, deceased Application November 7, 1938, Serial No. 239,218

6 Claims. (Cl. 20—92)

It is common practice to employ dowel pins for the purpose of connecting together, permanently or temporarily, boards arranged edge to edge. It has been the universal practice to place these dowel pins at right angles to the surfaces from which they project, so that the relative movements of two members, during the act of joining them, must be at right angles to the meeting edges. It is obvious that such dowel pins, unless cemented in place, or unless they are driven in tightly, offer no resistance to separation of the two members by a straight movement at right angles to the meeting edges. Furthermore, when a situation arises where two edges of a board or panel, arranged at right angles to each other, must be fitted against two other surfaces at right angles to each other, dowel pins cannot be employed at both pairs of meeting edges; because the relative movement required for one set of dowel pins to become properly seated is at right angles to the movement required for the seating of the other set of dowel pins.

The object of the present invention is to make it possible to connect two edges or faces meeting at right angles to a pair of similarly disposed edges or faces that are actually, or in effect, fixed relatively to each other, by means of dowel pins at both pairs of meeting edges or faces.

In carrying out my invention, I arrange the dowel pins at an acute angle instead of a right angle, so that the relative movement of two members to be joined together is not one at right angles to the edges that are to meet, but is diagonal; the movement being a composite one, composed of a component at right angles to said edges and another component lengthwise of the edges. Thus a panel having parallel pin-receiving holes extending into two edges at right angles to each other, may be set into a right angle corner from the sides of which project properly located parallel dowel pins, one set of which enters the holes in one edge of the panel while the other set enters the holes in the second edge of the panel. One result of this is that where a large area is to be covered with panels arranged edge to edge, many relatively small rectangular panels may be so disposed that the joints do not run in continuous lines entirely across the area to be covered, but may be broken at frequent intervals which need be no longer than the longest panel; and yet each panel except the border panels be interlocked with the four panels surrounding it and extending along the four edges thereof. One field of use for an arrangement of this kind is in floors or floor coverings. An entire floor or floor covering may be quickly assembled, with each piece firmly pinned to all of the surrounding pieces, so that no part of the floor can rise above an adjacent part. In fact, the whole is effectively tied together in a single structure.

Viewed in one of its aspects, therefore, the present invention may be said to have for its object to produce a simple and novel flooring or floor covering composed of relatively small tiles of wood or other material, all of which are effectively tied together without the use of cements or other adhesive or binding materials, and which do not need to be fastened to the subfloor or to a backing to secure them in place.

While a large floor or floor covering may be satisfactorily supported by resting loosely on an underlying support surface, it is evident that vertical walls or ceilings may be likewise faced or sheathed with relatively small pieces tied together, although fastenings are required to hold the entire structure in place.

My invention possesses characteristics that open still another large field of usefulness, namely that of prefabricated houses of which the walls are in the shape of panels which meet in edges of which one is provided with projecting, upwardly inclined dowel pins, and the other with pin-receiving holes also inclined upwardly from their entrances. When such a panel is placed in an upright position and the next panel is brought beside it while raised high enough to permit the dowel pins to enter the corresponding holes in the second panel, one need only allow the second panel to sink down after the dowel pins have entered the holes therein, gravity serving to draw the two panels into intimate edge contact with each other. Any load placed upon the upper edges of these two panels helps tighten the joint between the panels. All of the walls of a housing, both exterior and interior, may be fashioned from prefabricated panels and posts which are assembled at the point of use without requiring the employment of nails, screws, bolts or other fastening means than the dowel pins.

Therefore, viewed in one of its aspects, the present invention may be said to have for its object to make possible the easy and speedy building of the walls of a house from panels and other units small enough to be easily handled, without the use of nails, screws, bolts or other fastening means.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is an elevational view of a rectangular panel embodying the present invention; Fig. 2 is a fragmentary view similar to Fig. 1, on a much larger scale, showing the details of the dowel pins and holes or sockets; Fig. 3 is an elevational view, showing fragments of three panels two of which are engaged edge to edge in a manner to form a right angle corner, while the third is about to be set into the corner; Fig. 4 is a top plan view showing, on a small scale, one corner of a floor in a room, a part of the flooring or floor covering being broken away to expose the underlying floor pad or cushion and the subfloor; Fig. 5 is a section, on a larger scale, taken on line 5—5 of Fig. 4; Fig. 6 is a horizontal section through a wall of a building constructed in accordance with the present invention and illustrating formation of an inside corner and an outside corner; and Fig. 7 is a section on line 7—7 of Fig. 6.

In Figures 1 and 2 of the drawings the member A is shown as being rectangular in form. I shall refer to this member as a panel, although it may be a board, block or tile. Furthermore, while the present invention may be employed to great advantage in structures made from or containing plywood, it is not limited to this material, and the member A may therefore comprise material of any kind that is sufficiently stiff, strong and workable. For the sake of brevity, the member A will be referred to as a panel.

It will be seen that extending inwardly through all four edges of the panel are more or less diagonal sockets 1 which may be holes drilled or bored into the panel. All of these sockets are parallel to each other and parallel to the broad faces of the panel. The sockets are shown as being arranged at an angle of forty-five degrees to the edges of the panel, although the angle may be varied as long as parallelism between all of the sockets is maintained. Associated with the sockets in two of the edges that meet to form a corner of the panel are dowel pins 2. These pins are somewhat less than twice as long as the depth of a socket, and are preferably of such diameters that they may easily be placed in or removed from the sockets. In other words, the pins are preferably readily detachable. While, in some aspects of the present invention, the pins may be formed from any desired material, I prefer metal pins which may be accurately made so that they can be dropped easily into their sockets and still be a good fit there, and will possess great strength and durability.

Two panels may be brought together in substantially the same way as are two panels one of which has dowel pins projecting at right angles from an edge thereof; excepting only that the relative movements between the panels while the dowel pins on one of them are entering the corresponding sockets in the other, is a diagonal one. Because any two panels that are joined together must move diagonally relatively to each other, the empty sockets in the two edges of the panel A that are not provided with dowel pins may be engaged with two sets of dowel pins projecting from edges or surfaces at right angles to each other. Thus, as shown in Fig. 3, the panel A is about to be engaged with and secured to two other panels B and C which have already been interlocked, the panel C projecting beyond the panel B so as to form with the latter a corner into which a corner of the panel A may fit. It will be seen that when the panel A in Fig. 3 is moved toward the left and downwardly, at an angle of forty-five degrees, the socket in the lower edge of the fragment of panel A appearing in this figure will receive the pin projecting from the upper edge of panel B, whereas the socket in the vertical edge of the fragment of panel A will receive the pin projecting from the vertical edge of panel C above the panel B.

It follows that an entire floor or floor covering, for example, may be laid, one panel or tile at a time. Thus, in Fig. 4, there is shown a fragment of a floor at one corner of a room, in which the wearing layer of the floor or floor covering is composed of panels or tiles such as I have just described. In this particular assembly the tiles or panels marked A, B and C may correspond to those similarly designated in Fig. 3; the laying of the tiles having started from the side of the room at the left, not shown. With such an arrangement of tiles as shown in Fig. 4, there are no continuous joints across either the length or breadth of the room, but joints are broken at least as frequently as the length of the longer panels or tiles. Although it would be possible to pin together all of the meeting edges of tiles, having dowel pins projecting at right angles to the edges, in a case where the joints run continuously across at least one dimension of a room, by assembling a complete row of tiles parallel with such joints and then moving the row bodily into engagement with the portion of the floor or floor covering already laid, this could not be done in cases where the joints are not continuous.

Because the tiles or panels are all securely fastened together, the floor or floor covering does not require means to secure it to the subfloor. Thus, the cost of labor and material necessary for cementing a floor covering or floor to the subfloor is eliminated. It is usually advisable not to lay the wearing layer directly on the subfloor, since an intervening layer of yieldable material will serve both to compensate for irregularities in the surface contour of the subfloor and as a cushioning and sound-deadening means. This cushioning layer need not be fastened either to the subfloor or to the overlying wearing layer. Because the wearing layer of tiles need not be held down by being cemented to the cushioning layer, the latter need not be in the form of a solid sheet, but may be of open work or grill formation. Thus, in Figs. 4 and 5, I have illustrated the cushioning layer 3 as comprising a thick grill of soft rubber composed of two sets of narrow, bar-like elements or strands at right angles to each other.

The border tiles along two edges of a rectangular floor cannot be brought close to the corresponding walls of the room, but there must be left a clearance sufficient to permit these tiles to be laid beyond the ends of the dowel pins with which they are to be engaged. Usually, a clearance of about three-fourths of an inch will suffice. The spaces left between the edges of the floor or floor covering and the walls may conveniently be filled by moldings 4 resting on the subfloor S and bearing against the adjacent wall T. As best shown in Fig. 5, the moldings may be provided with lips or flanges 5 that overlie narrow marginal portions of the floor or floor covering. These moldings need not be fastened to the walls or to the subfloor, but may be secured to the panels or tiles; nails 6 being used for this purpose when the panels or tiles are composed of wood. The entire floor or floor covering, with its border moldings, is therefore a floating structure that simply rests on the subfloor and is free from attachment to the walls.

My invention makes it possible to secure novel and attractive designs in floorings and other panels, by employing plywood panels of any desired size, the facing veneers being chosen both for their utilitarian properties as a wearing layer for floors and for their attractiveness in appearance, particularly with respect to forming a constituent part of a complete ornamental design. The plywood need not be thick and heavy because, by using steel dowel pins, the sockets for the dowel pins may be of small diameter and will therefore not objectionably reduce the strength of the panels. The wearing face of the floor or floor covering may be of rare or costly woods, without making the cost of the whole too great, because the exposed facing veneers may be very thin compared to ordinary floor boards. Also, because the panels may be very thin and are without rigid support, the effect in walking across the floor is much the same as in walking over a thick rug or carpet.

Among the many other fields of usefulness which my invention has is that of prefabricated houses or even walls or partitions. All that is needed to build the necessary vertical walls of a house are suitable, preformed panels and posts which are assembled with no more effort or labor than to stand each piece in its proper place in an upright position, then to drop the necessary dowel pins into the edge which is to meet the next element, and then to place the next element in an upright position beside the first and hang it on the dowel pins; this process being repeated with panels and posts until all external and interior walls are completed. In Figs. 6 and 7 there is illustrated a fragment of a wall containing sections arranged at right angles to each other. In the particular wall illustrated, there are two corner posts 7 and 8, a panel or series of panels 9 between the posts, a panel 10 engaged with the post 7 and standing at right angles to the panel 9, together with a panel 11 engaged with the post 8 on the opposite side of the panel 9 from that on which the panel 10 lies. Each panel may be a box-like structure comprising two plywood members 12 and 13 spaced apart adjacent to their upright edges by suitable rails 14. The sockets for the dowel pins are located in the rail members of the panels.

As long as the sockets in what may be termed the trailing edge of each element extend upwardly from their points of entrance, and those in the advance edges or faces extend downwardly, one element after another may be added to the wall, as previously described. Thus, assuming that the panel 11 is in an upright position and has dowel pins projecting from the righthand edge, as viewed in Fig. 6, the post 8 is simply placed beside the vertical edge of the panel in contact with the ends of the dowel pins and, after being properly positioned laterally of the edges of the panel, is lowered until the dowel pins find their sockets in the side of the post and thus permit the post to settle and move over into engagement with the edge of the panel. The side of the post to be engaged by the panel 9 is then equipped with dowel pins and the panel 9 is added to the structure. If the distance between the posts 8 and 9 is greater than the width of a single panel, the necessary number of panels 9 are connected together by being added to the assembly, one after the other. The post 7 is then engaged with the dowel pins with which the corresponding edge of the panel 9 has been supplied, and then the panel 10 may be connected to the post 7. It will be noted that no pains are required to insure that each element will be pressed tightly against the preceding element, because the pins provide a wedging effect that causes each element to be drawn tightly against the one upon which it is first hung. Furthermore, the greater the load on top of a wall built as I have described, whether it have posts or be without posts, the greater the pressure tending to close the joints.

It will thus be seen that the parts constituting a wall may be assembled at the point of final use without employing nails, screws or bolts, and without the use of tools. Consequently, if the fabricator provides a sheet, all that the builder of the house need do in erecting the walls is to pick out the proper pieces, one after another, and set them in place. For this reason the labor cost for erecting walls is extremely low.

I claim:

1. In combination, rectangular panels arranged edge to edge in a manner to break joints extending in two directions at right angles to each other, dowel pins connecting each panel to all of the contiguous panels, all of the dowel pins being parallel to each other.

2. In combination, rectangular panels arranged edge to edge in a manner to break joints extending in two directions at right angles to each other, dowel pins connecting each panel to all of the contiguous panels, all of the dowel pins being parallel to each other, and parallel to the planes of the panels while making acute angles with the edges crossed by the same, each dowel pin extending into registering holes bored into the meeting edge faces of the panels connected thereby.

3. In combination, rectangular panels arranged edge to edge and covering an area large enough to cause some of the panels to be completely surrounded by other panels, dowel pins connecting each panel to all of the contiguous panels, all of the dowel pins being parallel to each other.

4. In a flooring or floor covering, relatively small rectangular panels arranged edge to edge, metal dowel pins fitting directly into sockets formed in the bodies of the panels connecting each panel to all of the contiguous panels; all of the dowel pins being parallel to each other, and to the planes of the panels, and making acute angles with the edges crossed by the same.

5. A rectangular panel having in each of its four edges bored holes or sockets for dowel pins all of which are parallel to each other and to a face of the panel, the axes of the sockets making acute angle with the edges through which they extend.

6. A flooring comprising relatively small rectangular panels arranged edge to edge, metal dowel pins connecting each panel to all of the contiguous panels; all of the dowel pins being parallel to each other and to the planes of the panels, and making acute angles with the edges crossed by the same.

GEORGE R. MEYERCORD.